United States Patent [19]
Gomez Ibarguengoitia

[11] Patent Number: 5,365,394
[45] Date of Patent: Nov. 15, 1994

[54] ELECTRONIC RELAY TO PROTECT MOTORS AND THYRISTORS AGAINST SYMMETRIC OVERLOAD, PHASE UNBALANCE AND SHORT-CIRCUIT

[75] Inventor: Francisco Gomez Ibarguengoitia, Sondica, Spain

[73] Assignee: Fanox Electronic, S.L., Sondica, Spain

[21] Appl. No.: 165,003

[22] Filed: Dec. 9, 1993

[30] Foreign Application Priority Data

Dec. 9, 1992 [ES] Spain ............... 9202504

[51] Int. Cl.$^5$ ............................................. H02H 7/08
[52] U.S. Cl. ..................................... 361/33; 361/93; 324/158.1
[58] Field of Search ................. 361/28, 30, 31, 33, 361/86, 93; 324/158 P

[56] References Cited

U.S. PATENT DOCUMENTS

| | | | |
|---|---|---|---|
| 4,345,288 | 8/1982 | Kampf et al. | 361/31 |
| 4,584,623 | 4/1986 | Bello et al. | 361/33 |
| 4,683,513 | 7/1987 | Miller | 361/76 |
| 4,710,844 | 12/1987 | Scott et al. | 361/96 |
| 4,967,307 | 10/1990 | Dougherty | 361/93 |

FOREIGN PATENT DOCUMENTS

2584877 7/1986 France .
2066597 7/1981 United Kingdom .

Primary Examiner—Todd Deboer
Attorney, Agent, or Firm—Darby & Darby

[57] ABSTRACT

A protective electronic relay is disclosed of the type which includes a feed source with a one-phase transformer, rectifying bridge, filter condenser and voltage regulator. Pickups are provided where one-phase signals are generated, connected to some diodes, connected to some capacitors and to a zener diode for the purpose of obtaining rectified, filtered and limited signals with a voltage level proportional to the line intensity of the protected motor. A multiple microswitch connected to some resistors permits presetting of the voltage level and nominal triggering intensity of a relay. An R-C network that can be timed in various scales comprised of resistors a capacitor and another multiple microswitch allows adjustment of the triggering time constant and is applied to that voltage level at the non-inverting input of an operational amplifier whose inverting input is at a reference voltage. Upon the non-inverting input of the operational amplifier reaching the reference voltage, due to a symmetric overload, the output of the operational amplifier passes to logic state 1. This sends a positive signal to the gate of a thyristor, driving it into conduction and depolarizing the base of a transistor making it pass from saturation to cut-off. As a result a relay connected to the collector of the transistor is triggered, changing the state of its contacts and causing disconnection of the protected motor.

20 Claims, 3 Drawing Sheets

ELECTRONIC RELAY TO PROTECT MOTORS AND THYRISTORS AGAINST SYMMETRIC OVERLOAD, PHASE UNBALANCE AND SHORT-CIRCUIT

FIELD OF THE INVENTION

Just as is expressed in the title of this specification, the present invention refers to an electronics relay to protect motors and thyristors against symmetric overload, phase unbalance and short-circuit, whose purpose consists of producing the automatic disconnection of a motor when there are circumstances in its feed lines which may damage the motor or impair its correct operation, such as unbalance between the phases of feed signals, symmetric overloads in the same or short-circuits; also permitting adjustment of the triggering time constant and of the nominal triggering intensity of the corresponding relay.

Besides, it has the purpose that the pickups used, which are the components that convert the feed line intensity of the motor into a one-phase voltage whose root-mean-square value is proportional to the intensity consumed, can be miniaturized to a larger than presently and are valid in a wide range of nominal intensities.

BACKGROUND OF THE INVENTION

Diverse electronic relays to protect motors that have intensity transformers are known, such as in the case of U.S. Pat. No. 4,345,288 and French Pat. No. A-2,584,877. The use of these transformers has the inconvenience that said elements take up a lot of space, are very heavy and expensive. Other inconveniences of these conventional relays are: the high temperatures that they are subjected to cause rapid wear of the same; their incapacity to endure overloads or short-circuits; their easy inconsistency regarding the initially established parameters; their incapacity to operate correctly in the presence of high voltage interference; lack of suitable control of the tigerring parameters; difficulty or trouble in resetting the same; or lack of suitable protection in the corresponding circuits.

Besides the cited U.S. and French patents have the inconvenience that the transformers are too big and provide a very weak signal, therefore, it must be amplified in an amplification stage, which is vulnerable to possible interferences of any type (Rf, etc.); which determines that the relay can be triggered for reasons others than malfunctioning of the motor, which represents a serious inconvenience.

On the other hand, the known technology for making pick-ups refers to the conversion of intensity into voltage, mainly using resistive pickup, inductive pickup and by means of the cited transformers.

I resistive pickup, the intensity to be controlled passes through a resistor, generating a one-phase voltage in the terminals of the same.

In inductive pickup a coil without a ferromagnetic core (with the winding in the open), is used with magnetic permeability near the unit and without an appreciable magnetic gain.

In pickup by means of transformers three transformers and the resulting secondary intensity subsequently converts into one-phase voltage by means of any of the two above cited methods.

These three pickup methods have inconveniences such as the impossibility of allowing a suitable miniaturization, excessive generation of heat, scarce range of usage intensities, need of ferromagnetic shielding, need to amplify the signals upon providing weak signals, etc.

In order to achieve the aims and to overcome the above cited inconveniences, the invention consists of an electronic relay to protect motors and thyristors against symmetric overload, phase unbalance and short-circuit that has precise and reliabel adjustment of the triggering parameters, suitable indicators and protection systems, and a simple and easy reset procedure. Besides, the present invention does not use intensity transformers thus its cost is advantageously low and its size is advantageously small.

The electronic relay of the invention, in its triggering function due to symmetric overload, generates some one-phase signals by means of three coils or pickups.

Each one of the three pickups is comprised by a U-shaped frame with one of its vertical branches longer than the other one for fastening thereof to the printed circuit. Between the vertical branches of the frame there is a core upon which the coil itself is placed, which is determined by a high number of spirals. In this way, free space between the coil and the frame is determined.

Each one of the three cables, through which the motor is fed, are made to pass through the free space comprised between the frame and a pickup coil, so that the passing of intensity generates a variable magnetic field generated upon the passing of the current, which is led through the core, generating at the outlet of the coil, a high voltage, that is proportional to the consumed intensity.

This arrangement solves the problems posed above, since the use of amplifying covers is no longer needed, nor is heat generated, nor is ferromagnetic shielding needed; which is a big advantage.

Besides, the pickups can be made of a minimal size, just as it will be commented on hereinafter; which likewise constitutes a big advantage.

The signals provided by the pickups are rectified by means of three diodes, filtered by two capacitors and the voltage thereof limited by a zener diode. Thus, a continuous voltage proportional to the motor line intensity is obtained. The level of said voltage is preset by means of an octuple microswitch which permits the variation of the total resistance of a group of eight resistors connected in shunt between said voltage and mass.

When this continuous voltage is equal to a reference voltage provided by a resistive divider connected in the inverting input of an operational amplifier, adjustment of the nominal intensity of the triggering of the relay is achieved. This reference voltage keeps the output of the operational amplifier in logic state 0, as long as its non-inverting input does not reach the value of said reference voltage.

In this non-inverting input, the continuous voltage alluded to first of all is applied by means of a R-C network that can be timed in five scales and comprised of four resistors and a quadruple microswitch that permits the variation of the feed resistence of the corresponding capacitor connected by means of a resistor fixed to the non-inverting input of the operational amplifier. When said input reaches the pre-set level of the reference voltage of the inverting input, the output of the operational amplifier for logic state 1, sending a positive signal through a diode and a resistor to the gate of a thyristor; whereby the latter enters in conduction and depolarizes by means of a resistor the base of a transistor. This makes said transistor go from saturation to blocking, with which the corresponding coil of a relay connected to the collector of the transistor deexcites, causing the relay to remain in the triggered state with two of its contacts closed and the other two open. Thus, the motor to be protected conveniently connected to said contacts, disconnects upon the coil of its contactor deexciting. This situation is indicated since a lighted indicator, connected through a resistor to the collector of the above cited transistor, receives in these circumstances the voltage needed for its activation.

In the electronic relay of the invention, in its triggering function due to phase unbalance, the one-phase signals generated by the above cited coils, are rectified by three other diodes and filtered respectively by both pairs of resistors and capacitors. These three filtered signals are applied respectively to the inverting inputs of three other operational amplifiers. On the other hand, said inputs receive a positive polarization by means of respective resistors connected to a positive voltage, thus guaranteeing a logic state equal to 0 in the outputs of said operational amplifiers during the absence of one-phase signals due to a dead motor.

The non-inverting inputs of these three operational amplifiers are polarized by a resistive divider at half the continuous voltage that was alluded to in paragraph two of this part. In this way, if the phases are balanced, the inverting inputs of said operational amplifiers are polarized with a level double that of the non-inverting ones, with which the outputs of these operational amplifiers remain in the logic state 0. If a reduction of any of the one-phase signals is produced below half the continuous voltage level alluded to in paragraph two of this part, any of the three operational amplifiers affected by this phase defect, will put its output in logic state 1.

The outputs of these three operational amplifiers connect through the corresponding diodes with the same electric point that connects with the diode of the output of the operational amplifier alluded to in paragraph three of this part, therefore any logic state 1 in the outputs of the three operational amplifiers will send a positive to the gate of the thyristor, which will enter into conduction, repeating the above cited process, whereby the motor to be protected will disconnect and the lighted indicator will become activated.

The electronic relay of the invention has triggering due to short-circuit, for which purpose a resistive divider that injects the continuous voltage alluded to in paragraph two of this part to the base of a transistor. Some of the resistors of this resistive divider can be connected or disconnected by means of another quadruple microswitch, which permits the level of triggering intensity due to short-circuit to be adjusted. The base of the transistor allueded to also connects to a capacitor that protects it against high frequency interferences. While the base-emitter voltage of said transistor does not reach a specific level, the latter remains blocked, permitting another transistor, whose base connects to the collector of the previous one and that is fed by means of a resistor, it is in saturation and has a practically non-existent collector-emitter voltage, with which the cathode of a diode connected to the collector of this latter transister, has a logic level 0. Said cathode connects with the gate of the thyristor alluded to above in this section, therefore under these conditions, said logic level 0 will not lead the thyristor to conduction, so the relay is not triggered due to short-circuit.

However, if said logic level reaches the value 1, the thyristor will enter in conduction, just as it happened when the output of any of the operational amplifiers had a logic level 1, and the relay will be triggered due to short-circuit. This happens when due to a short-circuit the continuous voltage alluded to in paragraph two of this part increases until it exceeds the blocking base-emitter voltage of the transistor alluded to first of all in the above paragraph, whereby said transistor passes to conduction, practically cancelling the base-emitter voltage of the following transistor, which will pass to blocking, and the feed voltage will be injected, through a resistor and diode connected to the collector of this last transistor, at the gate of the thyristor, which is equal to a logic level 1 in said gate which leads the thyristor to conduction and at which the triggering of the relay due to short-circuit is produced.

Resetting the relay is done simply by pushing a reset button which leads the gate of the thyristor to ground thereby cancelling its voltage and blocking it. At the same time the transistor enters saturation upon its base polarizing by means of a resistive divider, thus the relay coil is excited again, the lighted indicator is deactivated and the relay contacts that were closed open, while those that were open close.

The device of the invention also has a test button. Upon pushing said button, with the motor to be protected started in any charge state, the one-phase signal of one of the three coils alluded to in paragraph two of this part is short-circuited with ground, thus a phase fault is simulated and the relay is triggered by means of the the same process commented on above. This allows one to check when desired whether the operation due to phase unbalance is correct.

In the present invention a feed source comprised of a one-phase transformer, followed by a rectifying bridge and filter condensers whose output is applied to a regulator that supplies a stabilized voltage, has been provided for. When this voltage is applied to the electronic relay circuit, another visual indicator of said circuit remains lighted.

Besides, the electronic circuit relay has different protection and safety elements. Thus, the relay coil has a shunt connected diode that protects the transistor against disconnection surge of said coil. On the other hand the important voltage points in the device are protected, by means of capacitors, against transitory high frequency surges. These surges can also cause untimely triggerings in the operational amplifiers, therefore a R-C network has been included in the output of the same that provides suitable protection by means of a small that provides suitable protection by means of a small delay. Before said R-C network, the operational amplifier outputs include both diodes that were already mentioned in this part. These diodes protect their respective outputs against short-circuits between the same by direct connection to different logic states.

In terms of the amperage or range of intensities, different pickups have been designed with variations of the dimensions, number of wound rings, the size of the cores, the size and shape of the frames, the holes for passing the conductors, etc. Hence, novel features are obtained such as a great miniaturization of the components, achieving for example a miniature relay of up to 40 amperes with some exterior dimensions of 93×76×45 mm. Another novel feature is that a pickup system with a passing conductor that makes the installation and connection work easier is obtained, also providing the system with great safety. A wide range of nominal intensities, from 4 A. up to 180 A is obtained and with a passing conductor, which has not been achieved with other pickup systems.

With respect to known pickup technologies, the advantages of this novel inductive pickup method with ferromagnetic cores in the coils are the following:

With regard to resistive pickup technology:
Galvanic separation between the line of the motor and the relay
Total immunity with regard to short-circuits and overloads.
Heat generation free pickup
Much broader range of usage intensities. In this case, 15 A are not normally exceeded.
Voltage generated not affected by temperature. Less thermal drift With regard to inductive pickup with coil without a ferromagnetic core:
Total immunity with regard to perturbation magnetic fields
Ferromagnetic shielding outside the relay is not required
Without electronic amplifier of the voltages generated, for practical use thereof in the circuit
More sensitive pickup, in this case it is not possible to go below 20 or 30 amperes
Connection strips to the line of the motor are not necessary to maintain the distance between the horizontal axis of the conductor and the coil. A variation of the same gives rise to important variations of the generated voltage.

With regard to technology based on intensity transformers:
The 2nd. intensity conversion stage is avoided
3 transformers up to 180 are made unnecessary
The rest of the advantages indicated above.

Hereinafter, to provide a better understanding of this specification and forming an integral part of the same, some figures in which the object of the invention has been represented in an illustrative and non-restrictive manner are attached hereto.

DESCRIPTION OF AN EMBODIMENT OF THE INVENTION

Hereinafter a description is made of an embodiment of the invention mentioning the references used in the figures.

Figure 1:
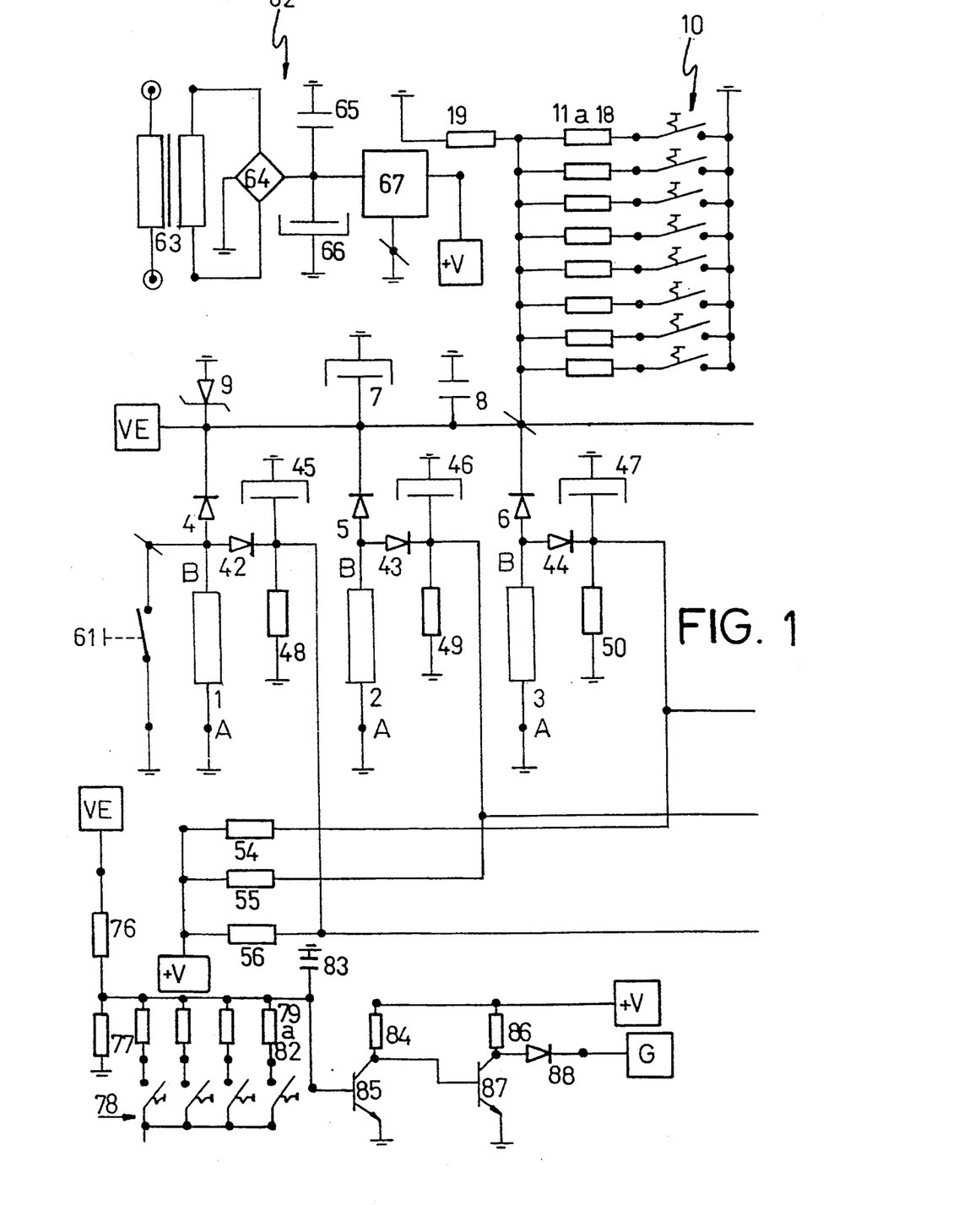
FIG. 1. It represents an electric diagram of one part of the electronic relay circuit of the present invention, which for greater clarify of the same has been separated into two figures, so that the four lines that remain cut in the right part of this FIG. 1 connect respectively with the four cut lines of the left part of FIG. 2. The top left part of this FIG. 1 includes the electric diagram of the circuit feed source.
Figure 2:
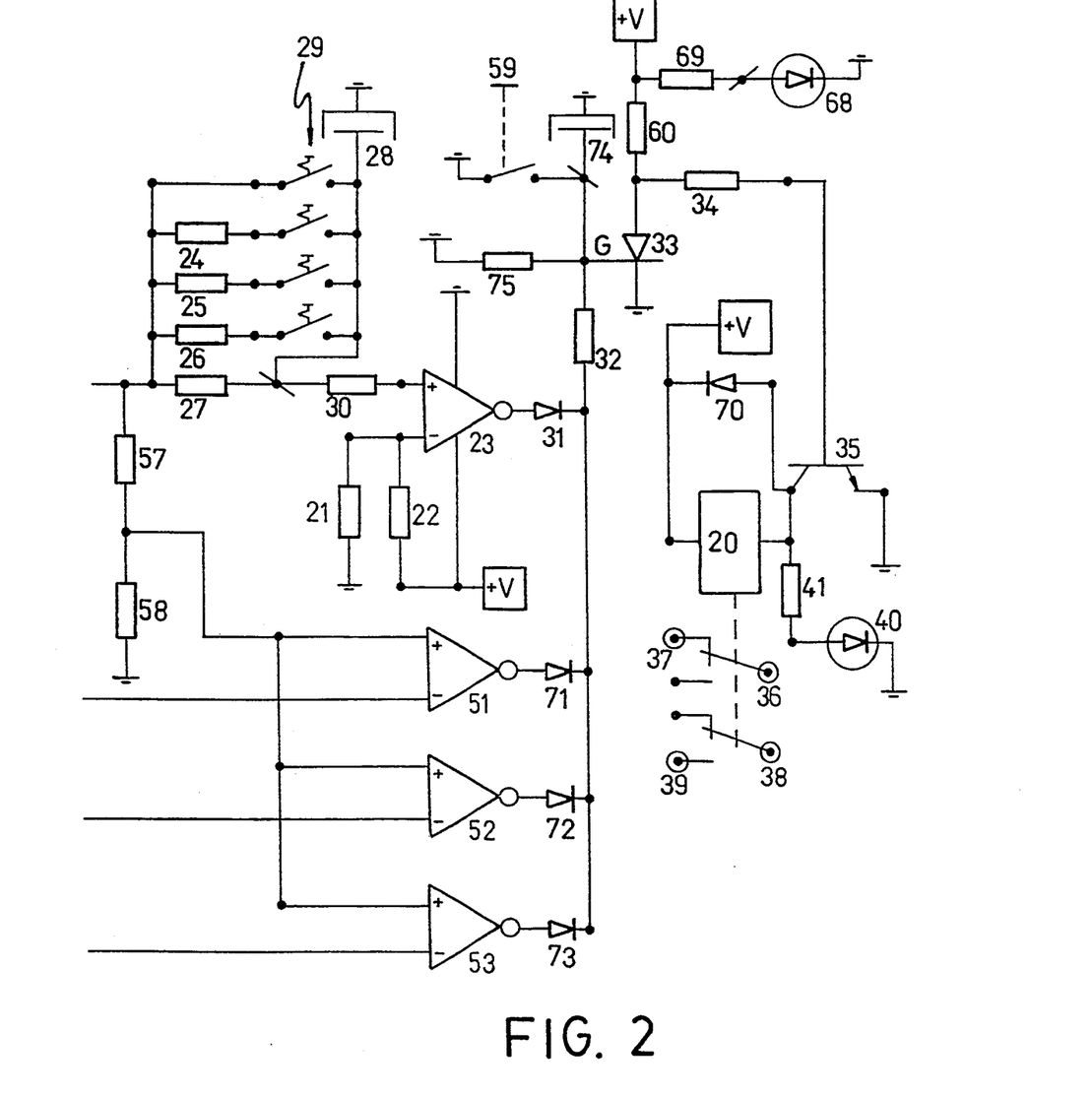
FIG. 2. It represents an electric diagram of the other part of the circuit of the electronic relay of the present invention which for the purpose of greater clarity has been represented in two figures, so that the four lines that remain cut in the left part of this FIG. 2 connect respectively with the four cut lines of the right part of FIG. 1.

Hence, the electronic relay to protect motors and thyristors against symmetric overload, phase unbalance and short-circuits of this embodiment has three coils or pickups (1, 2 and 3) in which some one-phase signals have been generated.

Figure 3:
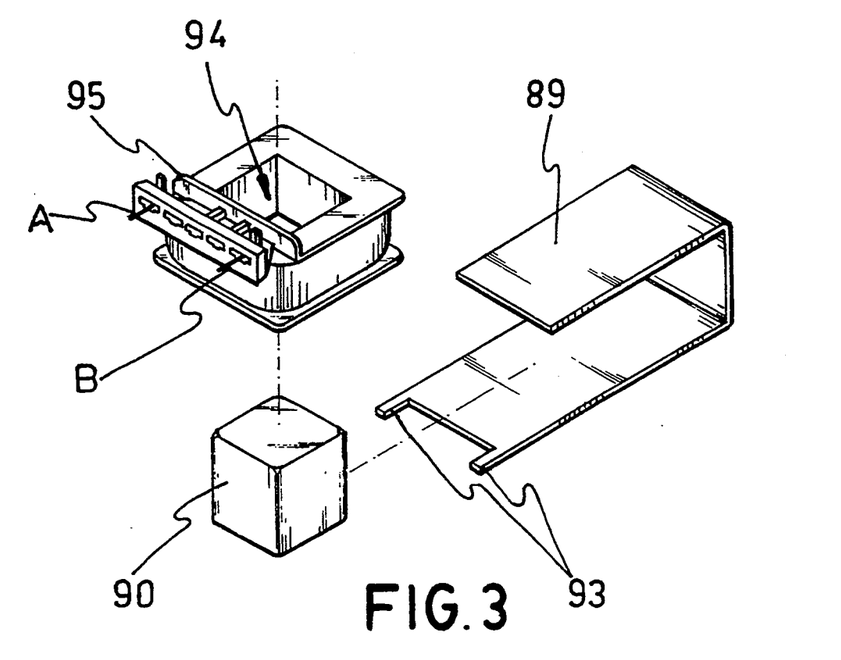
FIG. 3. It represents an exploded divided up view of the pickup used in the relay of the invention.
Figure 4:
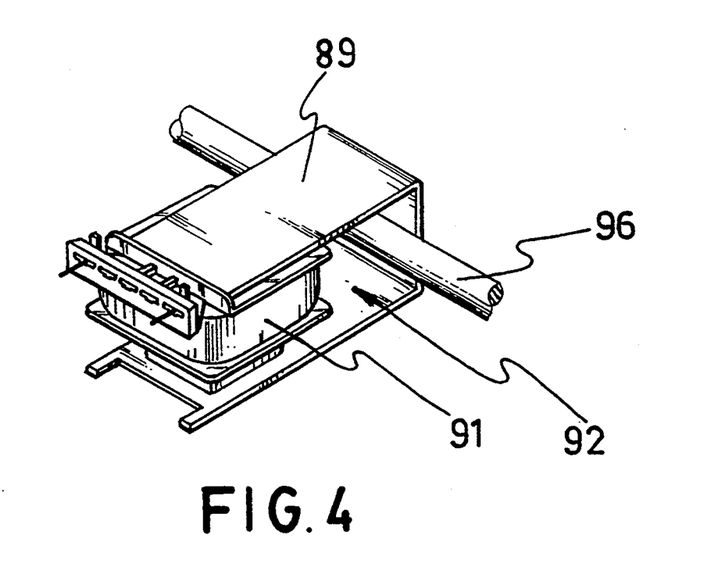
FIG. 4. It represents the pickup of FIG. 3 but with the elements already mounted.

Each pickup (1, 2 and 3) is comprised of a U-shaped frame (89) with one of its vertical branches longer than the other one, to make it easier to fasten same to the printed circuit through some tongues (93) and by means of welding.

The frame (89) is a low carbon content steel sheet.

Besides, the pickups (1, 2 and 3) are determined by a prism-shaped core (90), of low carbon content steel, upon which the coil itself (91) is mounted, just as it will be commented on hereinafter.

Coil (91) is a plastic reel with a square cross-sectional hole (94) upon which the different enamelled copper wire spirals are wound. Core (90) is located in hole (94) of the reel of the coil (91.)

Once the coil (91) has been mounted on the core (90), they are mounted on the frame sliding the core (94) from the ends until the shortest end of the frame (89) makes contact with the projection (95) of the reel of the coil.

In this way, between the coil and the frame there is a void (92) or free space through which one of the feed cables of the motor is passed.

The passing of the current through each one of the cables, generates a variable magnetic field in each one of the frames (89), leading the force lines of said variable magnetic field through the core (90.)

In this way, the coil (91) is induced obtaining at its outlets (A) and (B) a voltage proportional to the current consumed by the motor.

The voltage obtained in terminals (A) and (B) is around 2 volts, which represents a high value with regard to the voltages obtained by the conventional systems, which determines a simple subsequent processing and does not need the use of any amplifying stage to permit subsequent processing thereof.

Besides, by means of the pickups of the invention, due to their small size, the mounting of the elements is made much easier, at the same time that the cost thereof is considerably reduced.

Besides, given that the coil has a high number of spirals, and therefore is very long, it has a high impedance which determines that the adjustment of the signals to the triggering level thereof is done in a simple manner by means of the resistors with a high ohm value, with which the power consumed in the same, and therefore the heat generated is insignificant.

Due to the geometric shape of the magnetic circuit of the pickups (1, 2 and 3), the saturation intensity of the same is very much above the nominal adjustment intensity.

The system does not require magnetic shielding to be included as is usual in pickups with coils without a ferromagnetic core.

Each coil or pickup (1, 2 or 3) connects to a diode (4, 5 or 6) respectively for the rectification of said one-phase signals. In turn these diodes (4, 5 and 6) are connected to two capacitors (7 and 8) that filter these signals and a zener diode (9) that limits their voltage, obtaining a continuous voltage VE in the connection point common to said diodes (4, 5, 6 and 9), which is proportional to the line intensity of the protected motor. The level of this voltage VE is set by means of an octuple microswitch (10) that makes it possible to connect or disconnect to ground each one of the eight resistors (11 to 18) shunt connected in the connection point common to the diodes (4, 5, 6 and 9.) Said point connects with another resistor (19) that always remains connected to ground, so that the resultant of the shunt of this resistor (19) with the resistors (11 to 18) that are connected to ground according to the position of microswitch (10), determines voltage VE.

Adjustment of the nominal triggering intensity of relay (20) due to symemtric overload, is achieved, when VE is equal to a reference voltage supplied by the divider comprised of the resistors (21 and 22), that polarize the inverting input of the operational amplifier (23) and maintains its output in logic state 0 if its non-inverting input does not reach said level. As said nominal intensity depends on VE and due to the fact that the resistors (11 to 18) determine a logarithmic combination, the value of this intensity can be increased by 0.1, 0.2, 0.4, 0.8, 1.6, 3.2, 6.4, 12.8 or 25.5 amperes according to the position of microswitch (10), which provides a broad enough adjustment margen.

The circuit has a R-C network that can be timed in five scales comprised of resistors (24 to 27), capacitor (28) and the quadruple microswitch (29.) By means of this network voltage VE is applied in the non-inverting input of the operational amplifier, polarizing said input by resistor (30.) This RC network permits the adjustment of the triggering time constant to a value of R×C, 0.50 R×C, 0.33 R×C, 0.25 R×C or O, depending on the position of the quadruple microswitch (29.)

When the non-inverting input of the operation amplifier (23) reaches the preset level, its output is set at logic level 1, sending a positive signal through diode (31) and resistor (32) to gate G of the thyristor (33.) With this, said thyristor (33) enters in conduction and depolarizes through the resistor (34) to the base of the transistor (35) that will pass from saturation to blocking, which deexcites the coil of relay (20) that will pass, remaining it it, to the triggering state, with its contacts (36 and 37) closed and its contacts (38 and 39) open. Besides, the red LED diode (40) connected to the colector of transistor (35) by means of resistor (41) will light up, and the coil of the protected motor deexcites producing the disconnection of said motor. With LED (40) lighted up. the voltage in the coil of relay (20) triggered is very low and much less than the sticking voltage of the same, therefore there is no danger that said relay (20) be reset.

Pickups (1, 2 and 3) are also connected respectively to other diodes (42, 43 and 44), whereby they are rectified in another way, and for the triggering function due to phase unbalance, the one-phase signals generated in said coils (1, 2 and 3.) After being rectified by said diodes (42, 43 and 44), the signals are filtered by capacitors (45, 46 and 47) and by resistors (48, 49 and 50), after which they are injected respectively in the inverting inputs of the operational amplifiers (51, 52 and 53.) Said inverting inputs receive a positive polarization by means of resistors (54, 55 and 56), guaranteeing a logic state 0 in the outputs of the operational amplifiers (51, 52 and 53) in absence of one-phase signals due to a dead motor. The mon-inverting inputs of said operational amplifiers (51, 52 and 53) are polarized by means of the divider formed by resistors (57, 58) at a voltage of VE/2. When the phases of the corresponding signals are balanced, the inverting inputs of the operational amplifiers (51, 52 and 53) are polarized at a voltage equal to VE, while the non-inverting inputs are at VE/2; whereby the logic state of the outputs of the three operational amplifiers (51, 52 and 53) is 0. Any reduction of the one-phase signals below the level of VE/2, will produce a logic state 1 in the output of the operational amplifier (51, 52 or 53) affected by this phase fault, whereby a positive signal will reach gate G of thyristor (33), repeating the triggering phenomena of relay (20) described above.

The circuit of the example of the invention has a reset button (59) to reset relay (20) once it has been triggered. Upon pressing this button (59) gate G of thyristor (33) is connected to ground, whereby said voltage is cancelled and thyristor (33) is blocked. Besides, the base of transistor (35) is polarized though the divider formed by resistors (34 and 60), said transistor (35) passing to saturation, which shuts off red LED DIODE (40) and excites again the relay (20) coil, with which contacts (36 and 37) open and contacts (38 and 39) close.

The circuit has another button (61.) This is a test button and it allows one to check if the operation due to phase unbalance is correct. Upon pushing the test button (61) with the motor to be protected started in any charge state, the one-phase signal of coil (1) short-circuits, simultating a phase fault in the same, whereby relay (20) is triggered by means of the same process commented on above.

The circuit has a feed source (62) comprised of a transformer (63) connected to a rectifying bridge (64) whose output is filtered by means of two capacitors (65 and 66) and is applied to a regulator (67) that provides a stabilized voltage +V. With this voltage +V applied to the circuit, green LED diode (68) always remains lighted up upon being fed through resistor (69.) Voltage +V of the output of the regulator (67) is applied to all the points of the circuit of FIGS. 1 and 2 that have this reference, in other words, in the resistors (60 and 69) in diode (70), in resistor (22), in resistors (54, 55 and 56) and in resistors (84 and 86.)

The electronic relay of the present example has several protection elements. One of them is diode (70) that is shunt connected to the relay (20) coil and which protects transistor (35) against disconnection surge of said coil. Another one of them is defined by the two capacitors (8 and 65) that protect respectively voltages VE and +V against transistory highfrequency surge. Likewise, the network formed by resistor (32) and capacitor (74) protects, by means of slight timing, against untimely triggerings brought about in the operational amplifiers (23, 51, 52 and 53) by transitory high frequency surges. Another protection is comprised of diodes (31, 71, 72 and 73) connected in the outputs of the operational amplifiers (23, 51, 52 and 53), since said outputs thus remain protected against short-circuits between the same by direct connection to the different logic states. Another protection is comprised of a capacitor (83) that protects a transistor (85) against high frequency interferences. These elements (83 and 85) belong to a triggering block due to short-circuit that is commented on hereinafter.

Thus, said block has a resistor (76) connected between voltage VE and another resistor (77) that goes to ground. Said resistor (76 and 77) together with four other resistors (79 to 82) arranged in shunt with the resistor (77) define a voltage divder. Each one of the four resistors (79 to 82) can be connected or disconnected to ground by means of another quadruple microswitch (78) that permits the triggering intensity due to short-circuit to be selected between values of 2.5, 3.5, 4 and 4.5 times the nominal intensity.

The voltage divider alluded to in the above paragraph injects continuous voltage VE into the base of a transistor (85.) This base is connected to the protection capacitor (8) that was commented on above. The transistor (85) collector is connected to the feed voltage +V by means of resistor (84.) Siad collector is also connected to the base of another transistor (87) whose collector connects with gate G of thyristor (33) through a diode (88) and with feed +V through a resistor (86.) The emitters of transistors (85 and 87) are ground connected.

With this pattern, while the base-emitter voltage of transistor (85) does not reach a certain level, said transistor (85) remains blocked, whereby the transistor (67) will be in saturation and its collector-emitter voltage is practically non-existent, in such a way that the cathode of diode (88) has a logic level of O and gate G of thyristor (33) connected to it does not receive enough signal so that said thyristor (33) enters into conduction, with which relay (20) does not trigger due to short-circuit. Similarly when the output level of the operational amplifiers (23, 51, 52 and 53) was logic O.

On the other hand, if by short-circuit the voltage VE increases until it exceeds the base-emitter blocking voltage of transistor (85), the latter phase to conduction, cancelling practically the base-emitter voltage of transistor (87), which will pass to blocking; whereby the feed voltage +V is injected through resistor (86) and diode (88) in gate G of thryristor (33), so that the latter enters into conduction and relay (2)) is triggered due to short-circuit; similarly to what happened when any of the outputs of operational amplifiers (23, 51, 52 and 53) had a logic level 1. This triggering of relay (20) due to short-circuit, with the assembly of the present example of an embodiment, takes places in less than 30 milliseconds.

In this embodiment of the invention the following components have been used:

For pickups (1, 2 and 3), 1000 ohm and 3300 turn signal coils (91). For capacitors (8, 65 and 83), ceramic 10 nanofaraday and 500 volts capacitors. For capacitors (28 and 65), electrolytic 1000 microfaraday and 25 volt capacitors. For capacitors (7 and 74), electrolytic 33 microfaraday and 63 volt capacitors. For capacitors (45, 46 and 47, electrolytic 10 microfaraday and 63 volt capacitors. For diodes (4, 5, 6, 31, 42, 43, 44, 70, 71, 72, 73 and 88), 1N4148 diodes. For diode 9, a zener 9V1 one volt diode. For operational amplifiers (23, 51, 52 and 53), an integrated LM324N circuit. For diode (68), a green LED. or diode (40), a red LED. For regulator (67), a 7812 voltage regulator. For relay (20), a 12 volt, 212 ohm relay and 2 contacts. For rectifier (64), a one ampere and 380 volt rectifying bridge. For the reset control (59) a reset button. For the test control (61) a test button. For thyristor (33) a TIC106D1 thyristor. For transistors (35 and 87), BC639 transistors. For transistor (85), a BC517 transistor. For transformer (63), a 220 V/12 V and 2.8 W transformer.

All the resistors used are of ¼ W and their ohmic values are: 10K for resistors (19, 21 and 86). 110K for resistors (22, 30, 32, 48, 49, 50, 57, 58 and 75.) 220K for resistors (24, 25, 26 and 27). 3K9 for resistors (34, 41, 60 and 69.) 10M for resistors (54, 55 and 56.) 32K for resistor (77.) 100K for resistors (76 and 84) 221K for resistors (79, 80, 81 and 82.) Resistors (11 to 18) have respective values of 150K, 82K, 32K, 14K, 6K8, 2K7, 920 ohms and 430 ohms.

The technical features of the pickups for this embodiment, and according to the intensity ranges, are the following:

Intensity ranges between 10 A and 40 A:
Coil that consists of 6000 rings wound upon a plastic reel, with a hole of 10.5 × 10 m/m., and continuous resistance of 3100 ohms − 25° C.
Core, that consists of a prismatic piece of 11 × 10 × 10 m/m of F-111 steel
Frame, that consists of one U-shaped piece, of F-111 steel strip of 13 × 1 m/m, with a total unfolded length of 72 m/m
Holes for passing conductors of 8.5 × 8.5 m/m Intensity ranges between 25 A and 90 A:
Coil that consists of 4000 rings, wound on a plastic reel with a core hole of 13.5 × 13 m/m and continuous resistance of 1000 ohms −25° C.
Core, comprised of a prismatic piece of 16 × 13 × 13 m/m, of F-111 steel
Frame, that consists of one U-shaped piece, of F-111 steel strip of 20 × 1.5 m/m, with a total unfolded length of 102 m/m
Holes for passing conductors of 13 × 13 m/m Intensity ranges between 4 A and 16 A:
Coil that consists of 10,000 wound on a plastic reel, with a core hole of 13.5 × 13 m/m and continuous resistance of 6,400 ohms − 25° C.
The core and the frame, as well as the holes for passing conductors are the same as those described for the case of intensities between 25 A and 90 A.

Intensity ranges between 80 A and 180 A:
Coil that consists of 4000 rings wound on a plastic reel, of a core hole of 13.5 × 13 m/m and continuous resistance of 1000 25° C.
Core comprised of a prism of 28 × 13 × 13 m/m of F-111 steel
Frame, that consists of a U-shaped piece, of F-111 steel strip of 40 × 1.5 m/m, with a total unfolded length of 125 m/m
Hole for passing conductors of 0.25 m/m When this novel inductive pickup system with ferromagnetic cores in the coils is used, a miniature relay of up to 40 A can be manufactured, with some outer dimensions of 93 × 76 × 45 mm, the width being mm., critical in the design of Motor Control Centers up to intensities of 32 A.

In the relay model up to 90 A, thanks to said novel pickup system, there are dimensions of 96 × 76 × 76 mm, which allow optimization of the useful surface of the electric board.

Besides, the novel pickup system has a passing conductor that makes installation and connection easier, providing great safety to the system.

The broad range of nominal intensitieis, with a passing conductor, from 4 A up to 180 A, has only been achieved with this novel pickup system.

What is claimed:

1. Electronic relay to protect motors an thyristors against symmetric overload, phase unbalance and short-circuit, of the type that is applied to motors by means of its contacts, producing the automatic disconnection of the motor under certain circumstances and that has a feed source provided with a one-phase transformer, rectifying bridge, filter condenser and regulator that provides a stabilized voltage; characterized in that it has some pickups where one-phase signals are generated, connected to some diodes, connected to some capacitors and to a zener diode for the purpose of obtaining rectified, filtered and limited signals, with a voltage level proportional to the line intensity of the protected motor; including a multiple microswitch which connected to some resistors permits the presetting of said voltage level and nominal triggering intensity of a relay, also including a R-C network that can be timed in various scales comprised of resistors a capacitor and another multiple microswitch that allows adjustment of the triggering time constant and that applied to that voltage level at the non-inverting input of an operational amplifier whose inverting input is at a reference voltage, so that upon the non-inverting input reaching said reference voltage, due to a symmetric overload, the output of the operational amplifier passes to logic state 1, sending a positive signal to gate of a thyristor, which enters into conduction and depolarizes the base of a transistor making it pass from saturation to cut, whereby relay connected to the collector of transistor is triggered, changing the state of its contacts and causing disconnection of the protected motor and lighting up of a LED connected by means of a resistor to the collector of the transistor.

2. Electronic relay to protect motors and thyristors against symmetric overload, phase unbalance and short-circuit, according to claim 1, characterized in that the pickups are comprised of a U-shaped frame, one of whose vertical branches is longer in order to permit fastening thereof to the printed circuit plate through the tongues; and between which a core that supports a coil is located; it being foreseen that in each one of the free spaces determined between the coil and the frame, each one of the feed cables of the motor is made to pass through; all in order that the intensity that passes through said cables that is consumed by the motor, generates a magnetic field in the frame, closing the force lines through the core; obtaining an induction in the coil in whose outlet an alternating current induced by the magnetic field proportional to the intensity consumed by the motor is obtained, this voltage being a high value that facilitates subsequent processing thereof.

3. Electronic relay to protect motors and thyristors against symmetric overload, phase unbalance and short-circuit, according to claim 2, characterized in that it has a triggering block due to short-circuit comprised of a voltage divider formed by some resistors of which some of them can be independently connected or disconnected by means of a multiple microswitch that allows the triggering intensity due to short-circuit to be selected; said divider injecting the presettable voltage of the circuit in the base of a transistor, which also connects with a capacitor that protects against high frequency interference said transistor, which has its collector connected to the base of another transistor whose collector connects to gate of thyristor through a diode; the collectors of these transistors also being connected at the stabilized feed voltage of the circuit by means of both resistors; so that normally the first transistor is in short and the following transistor in saturation, sending a logic level 0 to thyristor which is insufficient to trigger the relay, but when due to a short-circuit, the presettable voltage exceeds the blocking base-emitter voltage of the first transistor, the latter passes to conduction and the following transistor to cut, whereby the stabilized voltage, equivalent to logic level 1, is injected in the gate of the thyristor, which brings about the triggering process by short-circuit, in relay.

4. Electronic relay to protect motors and thyristors against symmetric overload, phase unbalance and short-circuit, according to claim 3, characterized in that it has a reset button which pressed, connects the gate of the thyristor to the ground, said thyristor being blocked, and polarizing the base of transistor whose collector is connected to relay, producing this polarization by means of a divider formed by resistors, whereby said transistor passes to saturation causing the LED to go out and the resetting of relay; another button being provided for which when pressed, short-circuits with ground the one-phase signal of a coil, simulating a phase fault that causes the triggering of relay and allowing the verification whether the operation due to phase unbalance is correct.

5. Electronic relay to protect motors and thyristors against symmetric overload, phase unbalance and short-circuit, according to claim 4, characterized in that it has a diode shunt connected to the coil of relay, thus protecting the transistor connected to it against the disconnection surge of said coil; including other protecting diodes connected to the output of the operational amplifiers which thus remain protected against short-circuits between them by connection to different logic states; some capacitors that protect at different voltages in the presence of transistory high frequency surges having been provided for of which the operational amplifiers are protected by means of a resistor and a capacitor that introduce a small delay in the outputs thereof for the purpose of avoiding untimely triggerings that could be caused by said surges.

6. Electronic relay to protect motors and thyristors against symmetric overload, phase unbalance and short-circuit, according to claim 5, characterized in that the coils or pickups can be replaced by some pickups in which in a novel manner the corresponding coils include ferromagnetic cores in order to permit broad ranges of nominal intensities, as well as a miniaturization of the electronic relay unit, which were impossible to achieve in presently known pickups.

7. Electronic relay to protect motors and thyristors against symmetric overload, phase unbalance and short-circuit, according to claim 2, characterized in that it has a reset button which pressed, connects the gate of the thyristor to the ground, said thyristor being blocked, and polarizing the base of transistor whose collector is connected to relay, producing this polarization by means of a divider formed by resistors, whereby said transistor passes to saturation causing the LED to go out and the resetting of relay; another button being provided for which when pressed, short-circuits with ground the one-phase signal of a coil, simulating a phase fault that causes the triggering of relay and allowing the verification whether the operation due to phase unbalance is correct.

8. Electronic relay to protect motors and thyristors against symmetric overload, phase unbalance and short-circuit, according to claim 2, characterized in that it has a diode shunt connected to the coil of relay, thus protecting the transistor connected to it against the disconnection surge of said coil; including other protecting diodes connected to the output of the operational amplifiers which thus remain protected against short-circuits between them by connection to different logic states;

some capacitors that protect at different voltages in the presence of transitory high frequency surges having been provided for of which the operational amplifiers are protected by means of a resistor and a capacitor that introduce a small delay in the outputs thereof for the purpose of avoiding untimely triggerings that could be caused by said surges.

9. Electronic relay to protect motors and thyristors against symmetric overload, phase unbalance and short-circuit, according to claim 1, characterized in that the pickups also connected to other diodes in turn connected to capacitors and resistors for the purpose of rectifying and filtering by other ways the one-phase signals of pickups, after which they are injected in inverting inputs of other operational amplifiers, said inputs receiving positive polarization by means of some resistors and the non-inverting inputs of said operational amplifiers connecting to a divider formed by resistors which keep them polarized at half the presettable voltage, while the inverting inputs of these operational amplifiers are polarized at a presettable voltage when the corresponding phases are balanced, whereby the outputs of the operational amplifiers are in logic state 0, except when any of the one-phase signals drops below half the presettable voltage, whereby the output of the operational amplifier affected by this phase fault will pass to logic state 1, sending a positive signal to gate of the thyristor that bring about the triggering process relay.

10. Electronic relay to protect motors and thyristors against symmetric overload, phase unbalance and short-circuit, according to claim 9, characterized in that it has a triggering block due to short-circuit comprised of a voltage divider formed by some resistors of which some of them can be independently connected or disconnected by means of a multiple microswitch that allows the triggering intensity due to short-circuit to be selected; said divider injecting the presettable voltage of the circuit in the base of a transistor, which also connects with a capacitor that protects against high frequency interference said transistor, which has its collector connected to the base of another transistor whose collector connects to gate of thyristor through a diode; the collectors of these transistors also being connected at the stabilized feed voltage of the circuit by means of both resistors; so that normally the first transistor is in short and the following transistor in saturation, sending a logic level 0 to thyristor which is insufficient to trigger the relay, but when due to a short-circuit, the presettable voltage exceeds the blocking base-emitter voltage of the first transistor, the latter passes to conduction and the following transistor to cut, whereby the stabilized voltage, equivalent to logic level 1, is injected in the gate of the thyristor, which brings about the triggering process by short-circuit, in relay.

11. Electronic relay to protect motors and thyristors against symmetric overload, phase unbalance and short-circuit, according to claim 10, characterized in that it has a reset button which pressed, connects the gate of the thyristor to the ground, said thyristor being blocked, and polarizing the base of transistor whose collector is connected to relay, producing this polarization by means of a divider formed by resistors, whereby said transistor passes to saturation causing the LED to go out and the resetting of relay; another button being provided for which when pressed, short-circuits with ground the one-phase signal of a coil, simulating a phase fault that causes the triggering of relay and allowing the verification whether the operation due to phase unbalance is correct.

12. Electronic relay to protect motors and thyristors against symmetric overload, phase unbalance and short-circuit, according to claim 11, characterized in that it has a diode shunt connected to the coil of relay, thus protecting the transistor connected to it against the disconnection surge of said coil; including other protecting diodes connected to the output of the operational amplifiers which thus remain protected against short-circuits between them by connection to different logic states; some capacitors that protect at different voltages in the presence of transitory high frequency surges having been provided for of which the operational amplifiers are protected by means of a resistor and a capacitor that introduce a small delay in the outputs thereof for the purpose of avoiding untimely triggerings that could be caused by said surges.

13. Electronic relay to protect motors and thyristors against symmetric overload, phase unbalance and short-circuit, according to claim 12, characterized in that the coils or pickups can be replaced by some pickups in which in a novel manner the corresponding coils include ferromagnetic cores in order to permit broad ranges of nominal intensities, as well as a miniaturization of the electronic relay unit, which were impossible to achieve in presently known pickups.

14. Electronic relay to protect motors and thyristors against symmetric overload, phase unbalance and short-circuit, according to claim 1, characterized in that it has a triggering block due to short-circuit comprised of a voltage divider formed by some resistors of which some of them can be independently connected or disconnected by means of a multiple microswitch that allows the triggering intensity due to short-circuit to be selected; said divider injecting the presettable voltage of the circuit in the base of a transistor, which also connects with a capacitor that protects against high frequency interference said transistor, which has its collector connected to the base of another transistor whose collector connects to gate of thyristor through a diode; the collectors of these transistors also being connected at the stablized feed voltage of the circuit by means of both resistors; so that normally the first transistor is in short and the following transistor in saturation, sending a logic level 0 to thyristor which is insufficient to trigger the relay, but when due to a short-circuit, the presettable voltage exceeds the blocking base-emitter voltage of the first transistor, the latter passes to conduction and the following transistor to cut, whereby the stabilized voltage, equivalent to logic level 1, is injected in the gate of the thyristor, which brings about the triggering process by short-circuit, in relay. latter passes to conduction and the following transistor to cut, whereby the stabilized voltage, equivalent to logic level 1, is injected in the gate of the thyristor, which brings about the triggering process by short-circuit, in relay.

15. Electronic relay to protect motors and thyristors against symmetric overload, phase unbalance and short-circuit, according to claim 14, characterized in that it has a reset button which pressed, connects the gate of the thyristor to the ground, said thyristor being blocked, and polarizing the base of transistor whose collector is connected to relay, producing this polarization by means of a divider formed by resistors, whereby said transistors passes to saturation causing the LED to go out and the resetting of relay; another button being provided for which when pressed, short-circuits with ground the one-phase signal of a coil, simulating a phase fault that causes the triggering of relay and allowing the verification whether the operation due to phase unbalance if correct.

16. Electronic relay to protect motors and thyristors against symmetric overload, phase unbalance and short-circuit, according to claim 15, characterized in that it has a diode shunt connected to the coil of relay, thus protecting the transistor connected to it against the disconnection surge of said coil; including other protecting diodes connected to the output of the operational amplifiers which thus remain protected against short-circuits between them by connection to different logic states; some capacitors that protect at different voltages in the presence of transitory high frequency surges having been provided for of which the operational amplifiers are protected by means of a resistor and a capacitor that introduce a small delay in the outputs thereof for the purpose of avoiding untimely triggerings that could be caused by said surges.

17. Electronic relay to protect motors and thyristors against symmetric overload, phase unbalance and short-circuit, according to claim 16, characterized in that the coil or pickups can be replaced by some pickups in which in a novel manner the corresponding coils include ferromagnetic cores in order to permit broad ranges of nominal intensities, as well as a miniaturization of the electronic relay unit, which were impossible to achieve in presently known pickups.

18. Electronic relay to protect motors and thyristors against symmetric overload, phase unbalance and short-circuit, according to claim 1, characterized in that it has a reset button which pressed, connects the gate of the thyristor to the ground, said thyristor being blocked, and polarizing the base of transistor whose collector is connected to relay, producing this polarization by means of a divider formed by resistors, whereby said transistor passes to saturation causing the LED to go out and the resetting of relay; another button being provided for which when pressed, short-circuits with ground the one-phase signal of a coil, simulating a phase fault that causes the triggering of relay and allowing the verification whether the operation due to phase unbalance is correct.

19. Electronic relay to protect motors and thyristors against symmetric overload, phase unbalance and short-circuit, according to claim 1, characterized in that it has a diode shunt connected to the coil of relay, thus protecting the transistor connected to it against the disconnection surge of said coil; including other protecting diodes connected to the output of the operational amplifiers which thus remain protected against short-circuits between them by connection to different logic states; some capacitors that protect at different voltages in the presence of transitory high frequency surges having been provided for of which the operational amplifiers are protected by means of a resistor and a capacitor that introduce a small delay in the outputs thereof for the purpose of avoiding untimely triggerings that could be caused by said surges.

20. Electronic relay to protect motors and thyristors against symmetric overload, phase unbalance and short-circuit, according to claim 1, characterized in that the coils or pickups can be replaced by some pickups in which in a novel manner the corresponding coils include ferromagnetic cores in order to permit board ranges of nominal intensities, as well as a miniaturization of the electronic relay unit, which were impossible to achieve in presently known pickups.

* * * * *